United States Patent

Oestreich et al.

[11] Patent Number: 5,237,809
[45] Date of Patent: Aug. 24, 1993

[54] METHOD AND APPARATUS FOR STRANDING CONDUCTORS WITH CHANGING LAY DIRECTIONS

[75] Inventors: Ulrich Oestreich, Munich; Reiner Schneider, Ebersdorf, both of Fed. Rep. of Germany

[73] Assignee: Siemens Aktiengesellschaft, Munich, Fed. Rep. of Germany

[21] Appl. No.: 874,383

[22] Filed: Apr. 27, 1992

[30] Foreign Application Priority Data

Jun. 17, 1991 [DE] Fed. Rep. of Germany ....... 4119923

[51] Int. Cl.$^5$ .............................................. H01B 13/04
[52] U.S. Cl. .......................................... 57/293; 57/204
[58] Field of Search ............... 57/293, 294, 6, 13, 57/314, 204

[56] References Cited

U.S. PATENT DOCUMENTS

| | | | |
|---|---|---|---|
| 4,426,838 | 1/1984 | Garner et al. | 57/293 |
| 4,426,839 | 1/1984 | Garner et al. | 57/293 |
| 4,432,199 | 2/1984 | Dzyck et al. | 57/294 |
| 4,590,755 | 5/1986 | Garner . | |
| 4,615,168 | 10/1986 | Oestreich | 57/7 |
| 4,939,896 | 7/1990 | Blew | 57/293 |
| 4,974,408 | 12/1990 | Karhu | 57/293 |

FOREIGN PATENT DOCUMENTS

| | | |
|---|---|---|
| 0066800 | 12/1982 | European Pat. Off. . |
| 0158730 | 9/1990 | European Pat. Off. . |
| 682267 | 10/1939 | Fed. Rep. of Germany . |
| 3419594 | 11/1985 | Fed. Rep. of Germany . |

*Primary Examiner*—Joseph J. Hail, III
*Attorney, Agent, or Firm*—Hill, Steadman & Simpson

[57] ABSTRACT

A method and apparatus for stranding with changing lay directions (SZ-stranding) utilizes an elongated cylindrical member which is driven with changing rotational sense on which the conductors are wrapped and supplied to a stranding disk at one end. The cylindrical member serves the purpose of stranding and is held under an axial tensile stress at its ends during the stranding process. The cylindrical member is also twisted to provide a torsional stress.

9 Claims, 1 Drawing Sheet

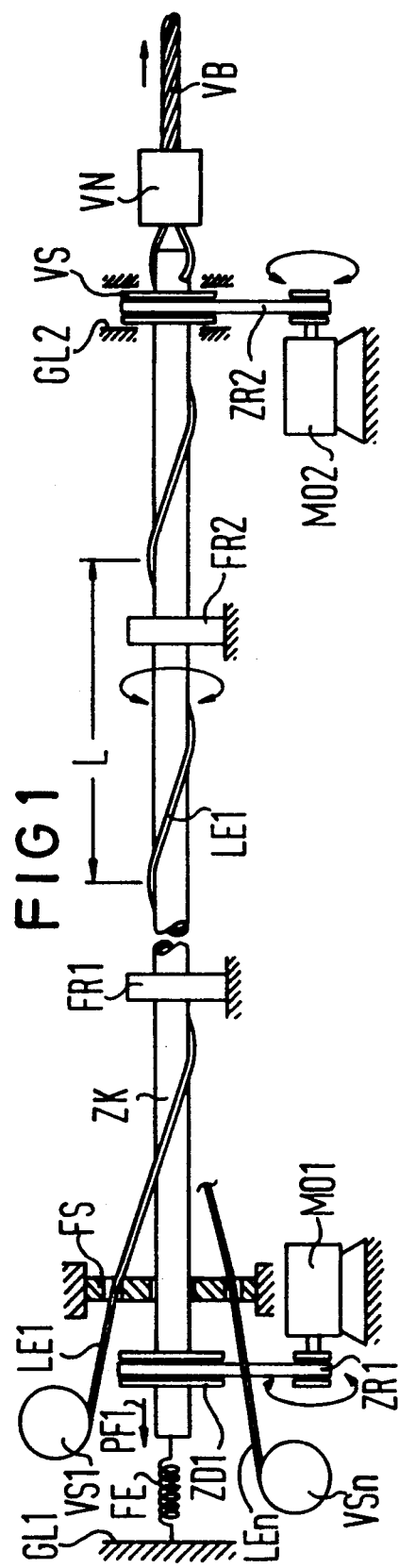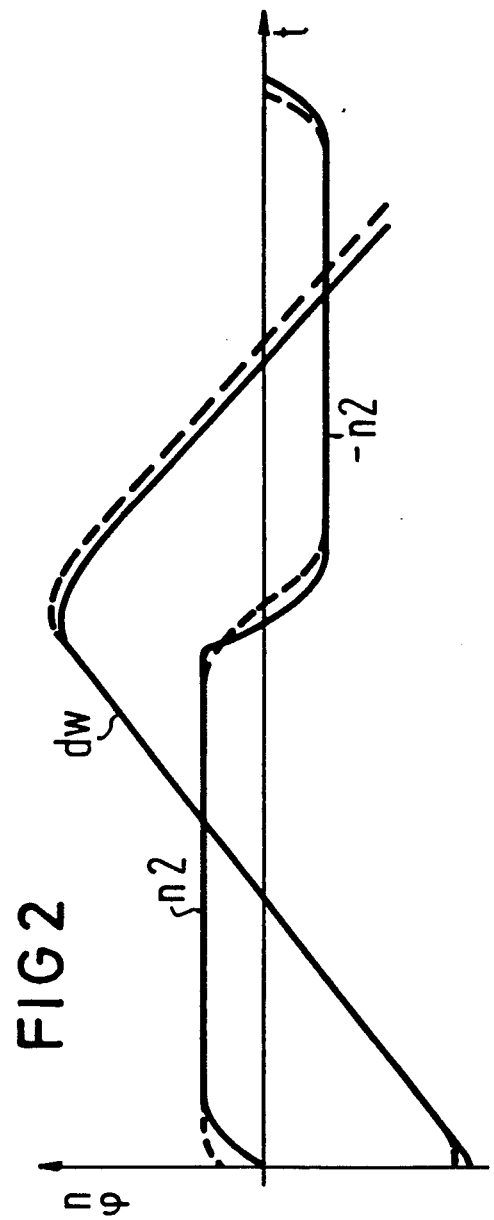

METHOD AND APPARATUS FOR STRANDING CONDUCTORS WITH CHANGING LAY DIRECTIONS

BACKGROUND OF THE INVENTION

The present invention is directed to a method and apparatus for stranding conductors, such as electrical and/or optical, with a changing lay direction to form SZ-stranding, said method and apparatus utilizes an elongated cylindrical member operated with changing rotational directions, which member is wrapped by the conductors that are supplied to a stranding disk at an end of the member.

It is known to strand electrical and/or optical conductors with what are referred to as "tube stores", wherein a cylindrical, tubular member is utilized and onto which member the light waveguides are stranded by a stranding disk connected to this tubular member. An example of such a device is disclosed in U.S. Pat. No. 4,615,168, whose disclosure is incorporated herein by reference thereto, and by EP 0 158 730. The tubes of these devices have their ends seated for easy rotation and are placed into rotation with changing rotational sense or direction via appropriate drive devices. The disadvantage in this known procedure is the extremely limited number of lays that can lie between two reversing points in the finished product. The frictional forces between the tube store, on the one hand and the outside wall of the conductors on the other hand will become too high given a high number of lays. This high frictional force is responsible because of the angles of wrap add up.

Care must also be exercised in these known tube stores to see that no vibrations or radial excursions occur in the tube store. In addition, the employment of tubes having a greater length is problematical, and for the reasons, intermediate supports in addition to the end bearing have been provided. However, assuming that a corresponding guide disk for the leads is provided in the region of the support and, thus, results therein that the leads must be lifted off from the surface of the tube in this region.

SUMMARY OF THE INVENTION

In a method of stranding conductors on a tube store, the object of the present invention is to show a way of how the limitations that limit the employment of tube stores of a traditional type can be avoided.

To accomplish these goals, it is done by an improvement in a method for stranding conductors selected from electrical and optical conductors with a changing direction by providing an elongated cylindrical member, rotating this member for a number of turns and then reversing the direction of rotation, wrapping the conductors on the cylindrical member and supplying the conductors wrapped thereon to a stranding disk at one end. The improvements are keeping the cylindrical member under an internal tensile stress.

It is guaranteed in this way that, even given a rotation and an extrusion in a radial direction caused, for example, by the elasticity of the cylindrical member, this will be diminished by the tensile stress. In the invention, the cylindrical element is no longer a tubular member supported only at its ends with, for example, roller bearings, but is an axially pre-stressed element that is significantly less sensitive to radial excursions. For example, one can, thus, work with a small or thin wall thickness or, respectively, moments of inertia. In addition, it is also possible to employ elements for the cylindrical members that themselves have no flexural strength or have inadequate flexural strength. For example, it is even possible to utilize wires or cables as the cylindrical member and to replace the tube store of the known type by a cable or by a wire. Many new design possibilities are, thus, available, whereby the limitations in view of structural strenght, for example that which was present given a tube store of the traditional type, for example in stranding methods working with rigid cylindrical members, are additionally completely overcome.

the invention is also directed to an improvement in an apparatus for the implementation of the method of the invention, which has the improvement in that the cylindrical member is seated at both ends and that the means for generating an axial tensile stress is provided at one of the ends or at both of the ends.

Other advantages and features of the invention will be readily apparent from the following description of the preferred embodiments, the drawings and claims.

BRIEF DESCRIPTION OF THE DRAWINGS

FIG. 1 is a schematic illustration with portions broken away for purposes of illustration of an apparatus for performing the method of the present invention; and FIG. 2 is a time diagram for the rotation of the cylindrical member of FIG. 1;

DESCRIPTION OF THE PREFERRED EMBODIMENTS

The principles of the present invention are particularly useful when incorporated in an apparatus illustrated in FIG. 1. In this apparatus, a plurality of supply reels or coils are provided. In FIG. 1, only two of the total of n reels, namely supply reels VS1 and VSn are shown. These supply reels contain electrical and/or optical conductors or leads LE1 and LEn, which will be supplied via an appropriate haul-off device to a stationary guide disk FS. This guide disk FS is provided with a number of bores distributed over the circumference, which are fashioned as ports, wherein the bores serve as guides for the respective conductors LE1 through LEn that are to be stranded with one another. In practice, a greater plurality of the conductors or leads is provided, for example n will be in a range of 4 through 20 or more.

The stranding occurs with the cylindrical member ZK that is placed into a changing rotation sense to create an SZ-stranding and, as a result thereof, the conductor elements are wrapped on this cylindrical member ZK. The cylindrical member ZK is rotatably seated in a stationary guide disk FS. Of course, other bearings that are not shown here could be provided for rotatably supporting that end of the member ZK. For the sake of clarity, only the conductor element LE1 is shown over the total length of the cylindrical member ZK. However, all of the leads will be wrapped in an analogous way on the cylindrical member ZK. A stranding disk VS that is, likewise, subjected to rotational movement is provided at the other end of the cylindrical member ZK and it is assumed in the present example that the stranding disk VS and the cylindrical member ZK run absolutely synchronously relative to one another in view of their rotation. To this end, the stranding disk VS has its internal opening firmly joined to the cylindrical member ZK and the two are driven in common by a toothed belt ZR2 via a motor MO2. The stranding disk VS comprises a number of bores or ports wherein the conductors are guided. After leaving the cylindrical member ZK, the stranding elements proceed to a stranding nipple VN to form a stranding bundle VB that will then be delivered to other processing equipment that is not shown. However, this other equipment can, for example, be an apparatus for the application of a retaining helix or additional stranding devices and/or an extruder for the application of an outer cladding.

An additional drive motor MO1 can be provided in the region of the guide disk FS, and this additional motor MO1 drives a gear wheel ZD1 via a toothed belt ZR1. This gear wheel is also rigidly connected to the cylindrical member ZK, like the disk VS.

What is critical in the invention is that the cylindrical member ZK is kept under an axial tensile stress illustrated by the arrow PF1. The production of the tensile stress PF1 is schematically indicated by a pre-stressed spring FE that transmits its tensile force onto the cylindrical member ZK and is held stationarily or rotatably in a counter-bearing or support GL1 at tis other end. For producing the tensile stress, for example an articulation or a thrust bearing that axially pre-stresses the cylindrical member ZK due to axial motion, can also be attached, for example, to the left end of the cylindrical member ZK. A counter-bearing GL2, that can be realized in the simplest way in that the stranding disk VS has its outer region supported against a stationary bearing block via plain bearings, is provided at the other end in the region, for example, of the stranding disk VS. As a result thereof, a continuous axial pulling can be exerted on the cylindrical member ZK to hold the latter under the corresponding axial pre-stress.

This axial pull can be kept adjustable, for example on the basis of a corresponding design of the axial bearings. With a non-synchronous operation of the two motors, the member ZK can also be kept under a torsional tension. The store in the form of the cylindrical member ZK itself thereby acts as a spring.

The employment of the cylindrical member ZK placed axially under a tensile stress offers the following advantages:

1. Even given a greater length of the cylindrical member ZK, the radial excursion potentially occurring due to the rotational motion and sag of the cylindrical member ZK is reduced. As a result thereof, it is possible, for example, to utilize cylindrical members having a considerably greater structural length without additional supports becoming necessary in the middle region;

2. The moment of inertia or, respectively, the diameter of the cylindrical member ZK can be more freely designed because a tube that is respectively rotatably seated at its ends is no longer present, as a result of the axial pre-stress (such as, for example, given a tube store having a traditional structure). Rather, a stretching of the cylindrical member ZK is effected;

3. Extremely long structural lengths for the cylindrical member ZK can be realized, because the vibrational behavior is improved as a result of the tensile pre-stress; and 4. It is no longer necessary to work with a tube as a cylindrical member ZK. On the contrary, members having a closed cross section, for example rods or even cables, wires or the like, that have no flectural stability, can be utilized.

The invention can be utilized with particular advantage when only relatively few conductors or leads having a moderate diameter are to be stranded.

It is thereby especially advantageous when the cylindrical member ZK is fashioned as a stretched elastic wire or as a stretched elastic cable, because, for example, an articulation at the left-hand end of the cylindrical member ZK can then be foregone, since such an elastic cable can be simply held firmly clamped in the region of the counter-bearing GL1 and, thus, this wire or cable is subjected to a reversing elastic torsion by the drive elements MO2 and MO1. Such a cylindrical element can accept many lays during the pre-stranding in the storage region and can see to a farthest region backtwist due to the roll-off of the leads on its circumference. Since it will execute one rotation per lay and because of a rigid clamping at the entry end, it can also act as a torsion spring and can, thereby, accelerate the reversing of the stranding disk VS. Spring steel (wires), spring stainless steel, anodized Aldrey, composite fiberglass-resin elements (GFK), composite carbon-fiber/resin elements (CFK) or similar structures come into consideration as materials for such wire-like or cable-like cylindrical members ZK. What is critical is that they can be easily elastically twisted and produce a corresponding resiliency. The dimensions of the wire will be based on the torsion limitation of the store wire and the angle of wrap resulting, given full occupation of the store ZK. The overall tension produced by the torsion and the tensile force dare not proceed beyond the product E zu1. Dependent on the material, E zu1 is approximately $7 \cdot 10^{-3}$ (for spring steel); $5 \cdot 10^{-3}$ (for high-strength steel); $3 \cdot 10^{-3}$ (for Aldrey); or $1 \cdot 10^{-2}$ (for either GFK or CFK).

A rigid, for example tubular, cylindrical member can also be subjected to a torsion and a resiliency can thereby also be generated given, for example, resilient chucking or employment of additional torsion elements at the left-hand end of the device.

A numerical example shall be referenced below in order to explain the conditions whereby the cylindrical element ZK should be manufactured as a wire of spring steel that has an outside diameter of 2 mm and with which a stranding of 3 through 10 conductors or leads having a diameter of approximately 2 mm is to be implemented. The axial pre-stress of the cylindrical member ZK is expediently selected to be in a range between $0.1 \cdot 10^{-3}$ and $2 \cdot 10^{-3}$. Under the assumption of an admissible torsional dilatation of, for example $\epsilon = 5 \cdot 10^{-3}$, given pure torsion.

$$\epsilon = \frac{\tau}{E} = \frac{G}{E} \cdot R \cdot \psi$$

wherein G=the rigidity modulus; R=the store radius=1 mm; E=the modulus of elasticity; $\tau$=torsion tension; and $\psi$=torsion angle (in radian measure).

For standard materials, $G/E \approx 0.3$ is valid, i.e.

$$\psi = \frac{\epsilon}{0.3} \cdot \frac{1}{R} = \frac{5 \cdot 10^{-3}}{0.3} \approx 1.5 \cdot 10^{-2} = \frac{2\pi}{L}$$

wherein $L =$ $$\text{shortest torsion period length} = \frac{2\pi}{1.5 \cdot 10^{-2}} \approx 420 \text{ mm.}$$

Given superimposed, axial pre-stress, the principal tension is to be calculated and is to be considered critical. The $2\pi$ torsion length then also becomes greater. To obtain 30 periods (for 60 lays) requires an active store length of at least $30 \times 0.42 = 12.6$ m. A length of 15 m is recommendable for the store wire.

The stranding angle $\alpha$ on the fully-occupied store would be given by $$L = 420:\alpha = \arctan \frac{L}{4R \cdot \pi} = 88.3°.$$

wherein the helical radius of curvature $$\rho = \frac{2R}{\cos^2\alpha} = 2240 \text{ mm}$$

would occur.

The wrap angle $\psi$ of the helix of 30 lays would be $$\psi \approx \frac{12600}{2240} = 5.63 = 320°$$

Given $\mu = 0.2$ obtainable given a smooth, potentially lubricated store surface, $\mu\omega = 1.126$ follows, for example, $\exp\mu\pi = 3.1$. A finely rough surface for the cylindrical member is advisable, for example anodized aluminum or piano steel aluminized and anodized. Cylindrical members of glass fiber composites (GFK) and carbon fiber composites (CFK) as stores are also, likewise, recommended.

The store must, thus, be well-matched to the stranding material for such a high number of lays.

One end of the store "wire" ZR is expediently firmly clamped, whereas the other end turns with the stranding tool or disk VS. Adequate pre-stress prevents more pronounced sag and vibrations. Easy exchangeability is expedient. The stranding disk VS is quite expediently driven via a centrifugal clutch that disengages when a minimum speed, for example 500/min, is fallen below, so that the stressed torsion spring accelerates and shortens the reversing event of the stranding and makes the reversing point more pronounced.

The potentially firmly clamped left end of the cylindrical member ZK can be driven with variable speed so that the different effective speeds of the stranding store can be set, given constant speed for the stranding disk VS. A speed n1 of the drive motor MO1 can be selected to be in a range between 0 and 2n, wherein 2n is the speed of the drive motor MO2.

The stranding concentration at the entry end can be avoided or matched on the basis of a slower rotation proceeding from the motor MO1, for example a low n1. Thus, an optimally expedient wrapping of the store can be achieved in any case.

The distribution of the lays on the store and the effective backtwist can also be influenced with these means. The drive motors MO1 and MO2 at the two ends of the store are always reversed synchronously, even given different speeds n1 and n2.

Concentric guide rings FR1 and FR2 (see FIG. 1) will prevent too great a lift-off, but, above all else, rollover of the stranding elements. The rings FR1 and FR2 are attached in order to hold the stranding elements on the store expediently at short intervals, for example at 0.5 m. The inside diameter of these stationary guide rings should be approximately 10% to 50% greater than the rotational space that is occupied by the stranding elements on the cylindrical member ZK.

Insofar as possible, the stranding disk VS should not force the elements to be lifted off from the store, so that no additional deflection angles are produced and the longitudinal friction is, thus, increased.

A time diagram of FIG. 2 shows that (see the solid line) the speed of n2 deriving from the drive motor MO2 is periodically switched for a value in the one direction to a value in the direction $-n2$. Such a curve of speed causes an approximately saw toothed-shaped course of the store angle dw. The broken lines, respectively, show the curve when a normal reversing occurs, i.e., when the cylindrical member ZK is not operated as a torsion spring, but can turn freely seated and is only pre-stressed in a longitudinal direction. When, by contrast, the cylindrical member ZK is additionally twisted, for example on the basis of a single end restraint, for example in the region of the counter-bearing GL1 and, when it has corresponding torsion properties, then a curve occurs, as shown by the solid line. The two speed lines diverge immediately after a reversing location, i.e., for example, given a change in rotational sense from n2 to $-n2$, this leading thereto that the rotational angle is diminished in accordance with the curve dw (see solid line) and, moreover, the reversing also begins more steeply and more pronouncedly (see the solid line at the transition from n2 to $-n2$). The reason for this may be seen wherein that the spring store that is formed by the cylindrical member ZK pre-stressed by torsion also promotes the reversing, for example, by a the stranding disk VS and introduces its spring energy into the reversing event.

The diameter of the cylindrical member ZK can be expediently selected between 1 mm and 5 mm at approximately the diameters of the leads or conductors to be stranded or somewhat thereabove.

The force with which the cylindrical member ZK is pre-stressed in the axial direction should be selected between 100N and 1000N (dependent on diameter, material and pre-dilatation).

The number of lays that can be applied on a cylindrical member can advantageously lie in a range of 10 to 50.

Although various minor modifications may be suggested by those versed in the art, it should be understood that we wish to embody within the scope of the patent granted hereon all such modifications as reasonably and properly come within the scope of our contribution to the art.

We claim:

1. In a method for stranding conductors selected from electrical and optical conductors with a changing lay direction to form an SZ-stranding, said method including the steps of rotating an elongated cylinder member, having a longitudinal axis, in a first direction around said longitudinal axis for a first period of time and then rotating the cylindrical member in a second opposite direction around said longitudinal axis for a next period of time by two drives disposed at opposite ends of said cylindrical member, wrapping the conductors on said cylindrical member while said cylindrical member is rotating and supplying the wrapped conductors to a stranding disk at one end of the cylindrical member, the improvement comprising the steps of employing a wire or cable as said elongated cylindrical member, imparting torsion to said cylindrical member while rotating said cylindrical member by operating said drives simultaneously at respectively different drive speeds, and keeping the cylindrical member under an axial tensile stress while rotating said cylindrical member.

2. In a method according to claim 1, wherein the step of wrapping the cylindrical member wraps the conductors over a length in a range of between 3 m and 20 m on the cylindrical member.

3. In a method according to claim 2, wherein the length is approximately 10 m.

4. In a method according to claim 1, wherein the step of wrapping wraps the cylindrical member at least 10 times by the conductors at the time of the maximum stranding.

5. In a method according to claim 1, wherein the tensile stress is of a size so that no inadmissible, radial excursion of the cylindrical member will occur during stranding.

6. In a method according to claim 1, which includes moving the conductors through a guide disk at the start of the cylindrical member prior to wrapping on the member.

7. An apparatus for stranding conductors selected from electrical and optical conductors with a changing lay direction to form an SZ-stranding, said apparatus comprising:

an elongated cylindrical member consisting of a wire or cable and having a longitudinal axis;

means including two drives disposed at opposite ends of said cylindrical member for rotating said cylindrical member in a first direction around said longitudinal axis for a first period of time and then rotating said cylindrical member in a second, opposite direction around said longitudinal axis for a next period of time and for imparting torsion to said cylindrical member while rotating said cylindrical member by driving said opposite ends simultaneously at respectively different drive speeds;

means for supplying said conductors to an exterior surface of said cylindrical member while said cylindrical member is rotating for wrapping said conductors on said cylindrical member;

a stranding disk disposed at one end of said cylindrical member to which said conductors are transferred from said cylindrical member; and means for maintaining said cylindrical member under an axial tensile stress while said cylindrical member is rotating.

8. In an apparatus according to claim 7, which includes means for limiting radial excursion and preventing lift-off of the conductors being provided along the course of the cylindrical member and including at least one guide ring.

9. In an apparatus according to claim 7, wherein the cylindrical member comprises a length in a range of between 2 m and 20 m.

* * * * *